United States Patent [19]

Stöhr et al.

[11] Patent Number: 4,977,782
[45] Date of Patent: Dec. 18, 1990

[54] DEVICE FOR MEASURING THE TORQUE OF A VALVE MOVED BY AN ACTUATOR

[75] Inventors: Hans Stöhr, Mannheim; Lothar Mehr, Lampertheim, both of Fed. Rep. of Germany

[73] Assignee: ABB Reaktor GmbH, Mannheim, Fed. Rep. of Germany

[21] Appl. No.: 369,471

[22] Filed: Jun. 21, 1989

[30] Foreign Application Priority Data

Jun. 21, 1988 [DE] Fed. Rep. of Germany ....... 3820835

[51] Int. Cl.⁵ .......................... G01L 5/00; G01L 3/10
[52] U.S. Cl. ................................ 73/862.29; 73/168; 73/862.35
[58] Field of Search ............. 73/168, 862.29, 862.31, 73/862.35, 847; 137/551, 552; 251/129.04

[56] References Cited

U.S. PATENT DOCUMENTS

| | | | |
|---|---|---|---|
| 4,496,286 | 1/1985 | Gagnon ...................... | 73/862.35 X |
| 4,660,416 | 4/1987 | Charbonneau et al. ..... | 73/862.32 X |
| 4,724,711 | 2/1988 | Sakakibara et al. .............. | 73/862.33 |
| 4,741,217 | 5/1988 | Morgan et al. . | |
| 4,879,901 | 11/1989 | Leon ...................................... | 73/168 |

FOREIGN PATENT DOCUMENTS

| | | |
|---|---|---|
| 1231517 | 12/1966 | Fed. Rep. of Germany . |
| 2340582 | 2/1975 | Fed. Rep. of Germany . |
| 2250141 | 7/1975 | Fed. Rep. of Germany . |
| 3014873 | 10/1981 | Fed. Rep. of Germany . |
| 3212946 | 11/1983 | Fed. Rep. of Germany . |
| 3507409 | 9/1986 | Fed. Rep. of Germany ... 73/862.31 |
| 3528364 | 2/1987 | Fed. Rep. of Germany . |
| 463145 | 11/1968 | Switzerland . |

Primary Examiner—Charles A. Ruehl
Attorney, Agent, or Firm—Herbert L. Lerner; Laurence A. Greenberg

[57] ABSTRACT

In order to measure torques on valves, measuring devices have heretofore been used which measure the force to be transmitted with the aid of weighing cells fitted with strain gauges. The structural make-up of such devices and the structural size resulting therefrom are not suitable to permit the measuring device to be permanently left between the valve and the electromotor, so that these measuring devices can be used only for periodic measurements. It is accordingly an object of the invention to provide a permanently installed device which allows continuous torque measurement. For this purpose, the housing of the actuator and the housing of the valve are connected to one another through a flanged bush. The flanged bush carries a strain gauge in the region of a recess, and has a clearance for the passage of the valve stem. While the flux of force reaches through an adaptor from the actuator to a threaded sleeve which adjusts the valve stem, the flanged bush fixedly disposed between the actuator and the valve is subjected to a torsional moment which is measured with the strain gauge.

3 Claims, 3 Drawing Sheets

DEVICE FOR MEASURING THE TORQUE OF A VALVE MOVED BY AN ACTUATOR

The invention relates to a device for measuring the torque of a valve moved by an actuator using at least one strain gauge.

In order to measure torques on valves, measuring devices have heretofore been used which measure the force to be transmitted with the aid of weighing cells fitted with strain gauges. The structural make-up of such devices and the structural size resulting therefrom are not suitable to permit the measuring device to be permanently left between the valve and the actuator or the electromotor of the actuator, so that such measuring devices can only be used for periodic measurements.

A torque-dependent cutoff for protecting the valve against overloading is known from German Pat. No. DE-PS 22 50 141 and from German Published, Prosecuted Application No. DE-AS 12 31 517. In that device, the worm shaft of the actuator is constructed as a displacement worm, which is held concentrically with the worm wheel through tension springs. If a load moment occurs at the drive shaft which is greater than the moment set by the biasing of the springs, the circumferential force on the worm wheel presses the worm shaft from its central position and acts through a lever system to actuate the associated torque probe, which electrically switches off the motor. Such a mechanical control unit is complicated, and susceptible to faults because of the multiplicity of mechanical transmission elements.

German Published, Non-Prosecuted Application No. DE-OS 35 28 364 discloses a reaction torque pick-up which is used mainly for tightening screws. It is formed of two flanges connected to one another through a torque tube.

Moreover, an arrangement of coaxial hub elements is known from Swiss Pat. No. 463 145, which enables a deflection of the flux of force to a chain drive. One of the hubs is constructed as a measuring hub.

It is accordingly an object of the invention to provide a device for measuring the torque of a valve moved by an actuator, which overcomes the hereinafore-mentioned disadvantages of the heretofore-known devices of this general type, which is permanently installed and which allows continuous torque measurement.

With the foregoing and other objects in view there is provided, in accordance with the invention, a torque measuring assembly, comprising an actuator having a housing, a valve being moved by the actuator and having a housing and a valve stem, a flanged bush interconnecting the housings and having a cylindrical part acting as a torque tube, at least one strain gauge for measuring the torque of the valve, the valve stem passing through the flanged bush and defining an annular space of annulus therebetween, and an adaptor disposed in the annular space or annulus for transmitting drive force between the actuator and the valve.

While the flux of force reaches through an adaptor from the actuator to a threaded bush which adjusts the valve stem, the flanged bush fixedly disposed between the actuator and the valve is subjected to a torsional moment which is measured through a strain gauge. Mechanical changes in the actuator/valve structural unit can be recognized early under the same operating conditions through the continuous measurement of the torque, by comparing varying torque characteristics. Consequently, preventive maintenance is possible before an unforeseen failure can cause heavy damage to technical plant. The torque values are used directly to start the electromotor of the actuator so that an expensive mechanical torque limiter is not required. Furthermore, the device can be used to control process sequences of a technical plant in the case of variable operating parameters. Thus, for example, in the case of a flow control armature, a varying torque can indicate a change in viscosity or flow.

With the objects of the invention in view, there is also provided a torque measuring assembly, comprising an actuator, a valve being moved by the actuator, and at least one strain gauge for measuring the torque of the valve, the actuator or the valve including a component being constructed as a monitorable torque element.

Through the use of a component of the actuator or of the valve as a torque element, the external structural dimensions of the valve/actuator structural unit are not altered, so that a displacement of the center of gravity, as in the case of achieving the object with a "flanged bush", does not occur.

In accordance with another feature of the invention there are provided coils associated with the at least one strain gauge for inductively transmitting measuring signals.

In accordance with a concomitant feature of the invention, there is provided a coil rotor connected to the component, the coil rotor covering the at least one strain gauge and serving as a protective shell.

Other features which are considered as characteristic for the invention are set forth in the appended claims.

Although the invention is illustrated and described herein as embodied in a device for measuring the torque of a valve moved by an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
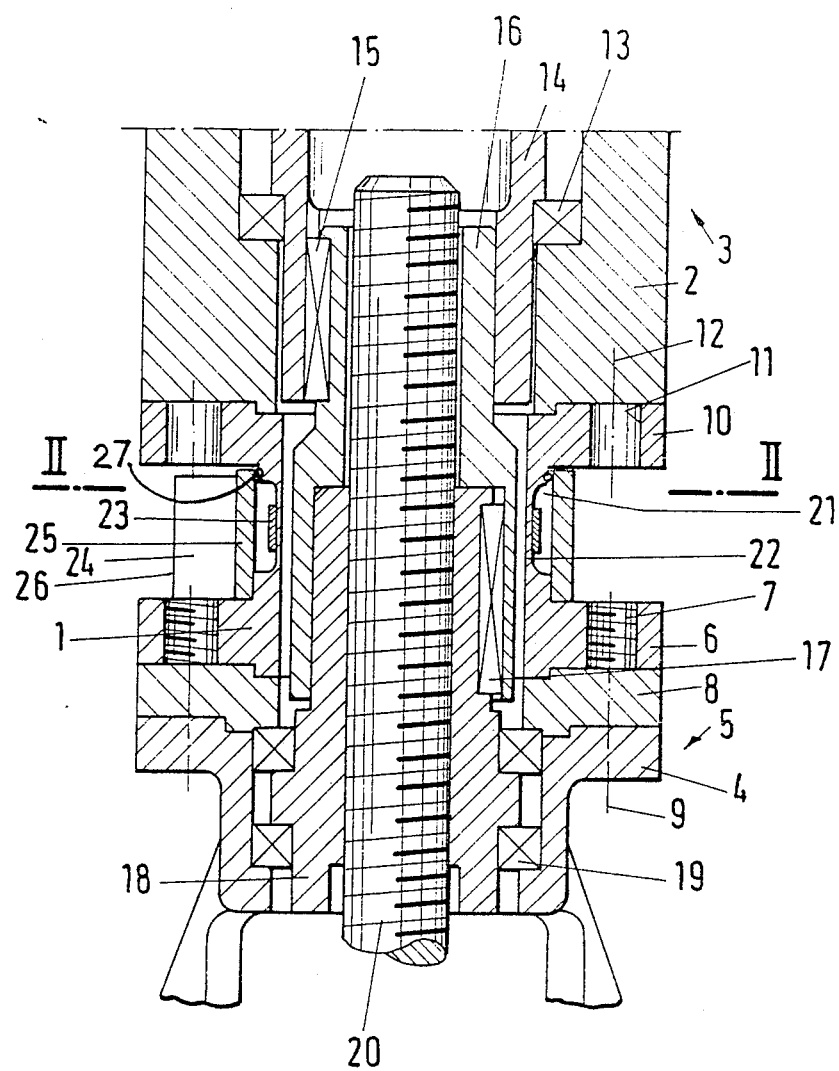
FIG. 1 is a fragmentary, diagrammatic, longitudinal-sectional view of a sub-region of an actuator and a valve with a flanged bush connecting the same.

Referring now to the figures of the drawing in detail and first, particularly, to FIG. 1 thereof, there is seen a flanged bush 1, which is joined with a housing 2 of a diagrammatically illustrated actuator 3 and a housing 4 of a diagrammatically illustrated valve 5, to form a fixed structural unit. For this purpose, a lower flange 6 of the flanged bush 1 is provided with threaded bores 7, each of which receive one screw indicated by reference numeral 9, which penetrates the housing 4 and a ring 8 associated therewith. An upper flange 10 of the flanged bush 1 has through bores 11 for receiving screws indicated by reference numeral 12, which engage in non-illustrated threaded bores in the housing 2.

In order to transmit the drive force of the actuator 3, a central driving pillar, column or support 14 of the actuator 3, which is supported through a ball-bearing 13 on the housing 2, engages in a sleeve-shaped adaptor 16 through a tongue-and-groove joint 15. A threaded sleeve 18, which is supported by a ball-bearing 19, is caused to rotate through a further tongue-and-groove joint 17 between the adaptor 16 and the threaded sleeve 18 of the valve 5, so that a stem 20 of the valve 5 executes a stroke. In this process, the stem 20 penetrates the sleeve-shaped adaptor 16.

The flanged bush 1 has a recess 21 formed therein between the flanges 6, 10 thereof, so that a relatively thin wall 22 remains at that location. The thin wall 22 carries two diametrically opposed strain gauges 23. The strain gauges measure a torque occurring in the form of a torsional moment, which corresponds to a reactive force formed by the flux of force between the central driving pillar 14, the adaptor 16 and the threaded sleeve 18. The measuring signals of the strain gauges are fed to a measuring amplifier indicated by reference numeral 24. From the measuring amplifier, the output signal reaches a non-illustrated evaluation station and/or a non-illustrated control unit of the actuator motor. In the evaluation station, the torque characteristics are compared with desired curves of specified operational sequences of actuator/valve structural unit. Deviations give information about mechanical changes in the structural unit and permit preventive maintenance, for example. The signals flowing into the control unit of the electromotor for the actuator cause the motor to be switched off when a permissible torque is exceeded. A protective sleeve 25 covers the recess 21 and carries a housing 26 of the measuring amplifier 24. A seal 27 protects the strain gauges 23 disposed in the vicinity of the recess 21 against contamination and/or damage.

Figure 2:
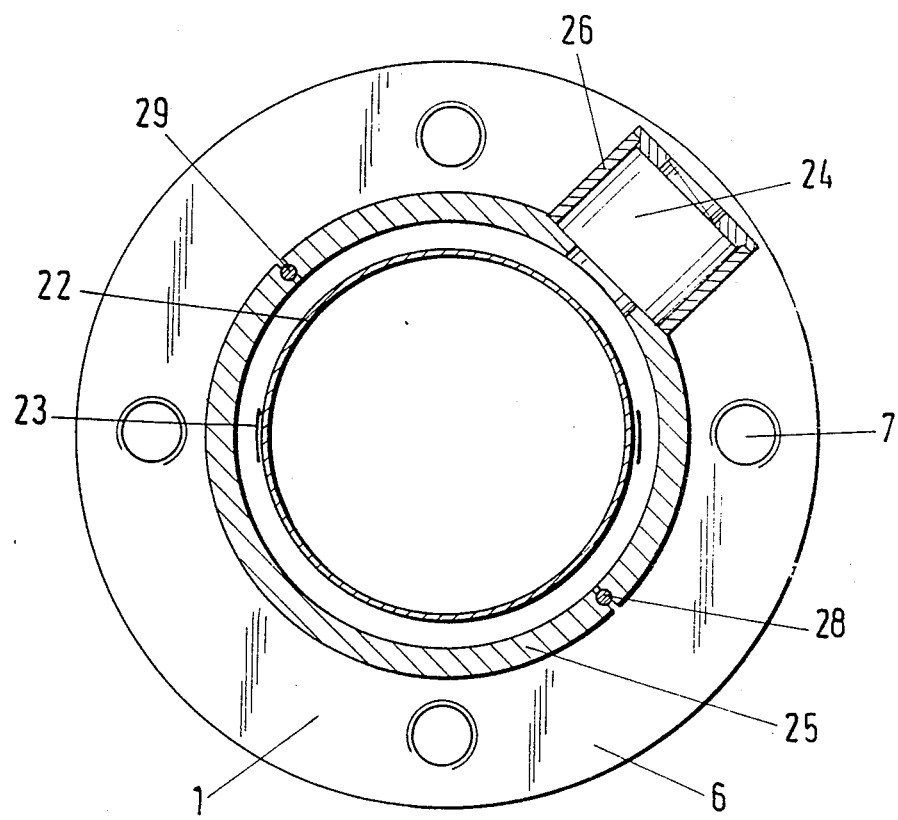
FIG. 2 is a cross-sectional view taken along the line II—II of FIG. 1.

FIG. 2 is a section taken along the line II—II of FIG. 1, which shows the position of the strain gauges 23 and of the measuring amplifier 24. The protective sleeve 25, which has a hinge 28 and a closing element 29, embraces the wall 22 concentrically, and carries the housing 26 of the measuring amplifier 24.

Figure 3:
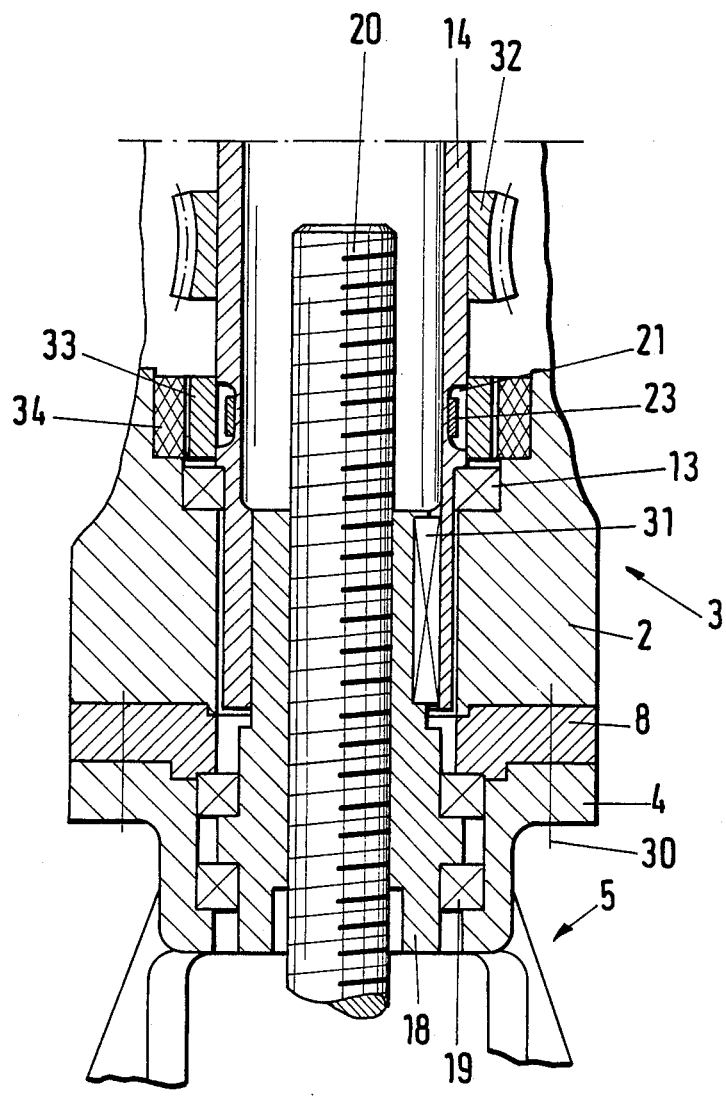
FIG. 3 is a fragmentary, longitudinal-sectional view of a sub-region of a structural unit of an actuator/valve with a central driving pillar of the actuator constructed as a torque element.

FIG. 3 shows another embodiment example, in which the housing 2 of the actuator 3 and the housing 5 are joined to one another directly through a screw connection 30. The central driving pillar 14 is frictionally connected to the threaded sleeve 18 through a tongue-and-groove joint 31. Rotation of the threaded sleeve 18 supported through the ball-bearing 19 causes the stem 20 of the valve 5 to perform a stroke. A worm wheel 32 connected to the central driving pillar 14 is driven by a non-illustrated worm shaft. A component of the actuator 3 along with the central driving pillar 14, is constructed as an expansion bush through the recess 21, which carries diametrically opposed strain gauges 23 in the vicinity of the recess 21. A coil rotor 33 associated with the central driving pillar 14 and a coil stator 34 fixedly joined to the housing 2, serve to inductively transmit the measuring signals to a non-illustrated measuring amplifier. In this process, the coil rotor 33 simultaneously serves as a protective shell for the strain gauges 23. The flux of force and the rotary motion of the actuator is fed directly into the threaded bush. The region of the central driving pillar 14 which is provided with a weakened area, is subjected to a torsional moment. This torsional moment is measured through the strain gauges, and passed on inductively to the non-illustrated measuring amplifier. Further signal processing takes place in the same way as for the embodiment example according to FIG. 1.

Apart from the embodiment examples described above having the central driving pillar 14 as the carrier of the strain gauges 23, it is particularly possible as an alternative thereto to equip the following components with a weakened area which easily detects the torsional moment:

A valve threaded bush, webs of intermediate valve brackets, an adaptor for transmitting the drive forces, and input and output shafts, bushes, flanged connections and other coupling elements, which are applied as transmission components between the electromotor or the actuator and the valve.

The foregoing is a description corresponding in substance to German Application No. P 38 20 838.5, dated June 21, 1988, the International priority of which is being claimed for the instant application, and which is hereby made part of this application. Any material discrepancies between the foregoing specification and the aforementioned corresponding German application are to be resolved in favor of the latter.

We claim:

1. Torque measuring assembly, comprising an actuator having a housing, a valve being moved by said actuator and having a housing and a valve stem, a flanged bush interconnecting said housings and having a cylindrical part acting as a torque tube, at least one strain gauge for measuring the torque of said valve, said valve stem passing through said flanged bush and defining an annular space therebetween, and an adaptor disposed in said annular space for transmitting drive force between said actuator and said valve.

2. Torque measuring assembly, comprising an actuator, a valve being moved by said actuator, at least one strain gauge for measuring the torque of said valve, said actuator including a component being constructed as a monitorable torque element, coils associated with said at least one strain gauge for inductively transmitting measuring signals, and a coil rotor connected to the component, said coil rotor covering said at least one strain gauge and serving as a protective shell.

3. Torque measuring assembly, comprising an actuator, a valve being moved by said actuator, at least one strain gauge for measuring the torque of said valve, said valve including a component being constructed as a monitorable torque element, coils associated with said at least one strain gauge for inductively transmitting measuring signals, and a coil rotor connected to the component, said coil rotor covering said at least one strain gauge and serving as a protective shell.

* * * * *